INVENTORS
WOLFGANG GRASSMANN
BY KURT HANNIG

ATTORNEYS

United States Patent Office 3,519,549
Patented July 7, 1970

3,519,549
APPARATUS FOR PERFORMANCE OF CARRIER-FREE, CONTINUOUS ELECTROPHORESIS IN VERTICAL CELLS
Wolfgang Grassmann, 10 Jungwirthstrasse, 23 Munich, Germany, and Kurt Hannig, 45 Pentenriederstrasse, 8033 Munich, Germany
Filed Nov. 17, 1964, Ser. No. 411,845
Claims priority, application Germany, Nov. 18, 1963, G 39,197; Dec. 13, 1963, G 39,383
Int. Cl. B01k 5/00
U.S. Cl. 204—299     11 Claims The present invention relates to an apparatus for the performance of a carrier-free, continuous electrophoresis in which the electrophoresis or separation chamber is positioned vertically or substantially vertically and the cooling means are constructed so that an operation of the chamber in vertical position is possible.

In conjunction with a carrier-free, continuous electrophoresis apparatus, the separation chamber has heretofore been positioned horizontally or substantially horizontally. If mixtures of substances are to be separated which comprise components which tend toward sedimentation, such as cells, bacteria, coarsely dispersed high molecular weight particles or impurities, these particles tend to deposit on the lower plate of the separation chamber, consequently the electrophoretic separation becomes indistinct after only a short period of time of operation of the apparatus and during the operable period the separation does not remain constant.

It is not possible to vertically or substantially vertically position a chamber designed for horizontal operation in order to avoid interferences due to such a sedimentation because heat currents form in the buffer film due to the joule effect, even under the most minute temperature differences obtained by prior art methods, when the chember is in a vertical position, causing a separation to become impossible.

The present invention is intended and adapted to overcome the difficulties and disadvantages inherent in prior methods for electrophoretic separation in vertical position, it being among the objects of the invention to provide a process which will eliminate the unfavorable results of the joulean heat effect in the separation by a continuous operation with the separation chamber in vertical position.

Another object of the present invention is an apparatus for continuous free-flow electrophoresis comprising two rectangular, electrically non-conductive plates in spaced alignment to each other forming a separation chamber, said separation chamber being substantially in a vertical arrangement; a pair of electrode chambers each ionically connected to one of a pair of opposite side edges of said plates and ionically communicating with said separating chamber, each of said electrode chambers enclosing at least one electrode electrically connected to an electrical source; a third marginal top section of said separating chamber being electrically non-conductive and tightly sealed between said electrode chambers; at least one connection to a buffer solution and supply feed inlet to said separation chamber adjacent to said third marginal top section; the marginal space opposite said feed inlet connections being closed by a horizontal bar having a plurality of outlets arranged at regular intervals over its entire length between said electrode chambers communicating with a plurality of receptacles, each of said outlets extending from the inner separating space between said plates to its paired outer receptacle for solution flowing out of said outlet whereby each of said receptacles is in liquid connection; means for supplying buffer solution and material to be electrophoretically separated to said feed inlet connections; and means for intermittently withdrawing electrophoretically separated material and buffer solution from each of said collecting receptacles simultaneously and in equal volume in ratio to the flow rate through said separating space; and at least one cooling means comprising a heat distribution plate which is in heat-conductive, electrically non-conductive connection with said separation chamber, said heat distribution plate consisting of a heat-conductive material being in heat-conductive contact at a plurality of points with a least one cooling device on its surface which faces away from said separation chamber.

It is also among the objects of the present invention to provide an apparatus for conducting the present process which is simple in construction, efficient in design and which may be readily operated by ordinary plant workmen.

These and other objects of the invention will become more apparent as the description thereof proceeds.

In accordance with the present invention, these difficulties of the prior art are overcome by providing at least one heat distribution plate which is connected in heat-conductive fashion with a least one of the walls of said separation chamber, said heat distribution plate being intensively cooled at several points on the side which faces away from the separation chamber. The cooling effect can, according to one preferred embodiment of the present invention, be achieved by means of Peltier cells, or in accordance with another preferred embodiment of the invention it may be accomplished by means of an evaporation cooler which is in heat contact with several points of the heat distribution plate on the side which faces away from the separation chamber.

An illustrative embodiment of the invention is shown in the attached drawings, of which:

Figure 1:
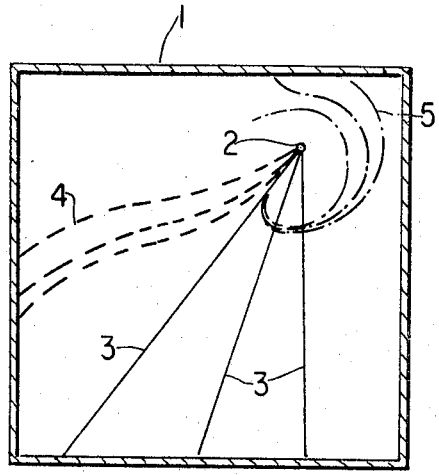
FIG. 1 shows schematically the paths of the components of a substance mixture to be separated in a vertical chamber, wherein heat currents are caused by minor temperature differences.

The heat distribution plate itself consists advantageously of a material having good heat conduction properties, such as copper or silver.

By means of this heat distribution plate it is possible to achieve such a uniformity of temperature in the chamber that a sharp separation can be performed even when the chamber is in a vertical position.

Even when the lower edge of the copper plate is at a temperature of about 0.5° C. less than its upper edge, this minor temperature differential will have a favorable rather than detrimental effect upon the stability of the buffer film because the temperature gradient extends only in the direction of the buffer current, that is, from top to bottom. In a horizontal direction, however, practically no temperature differential is possible because of the horizontal arrangement of the cooling devices. A convection, which always occurs only when the warmer solution is located below a supernatant colder solution, therefore acts in the reverse sense, that is, only in a stabilizing sense upon the buffer film when there is a slight temperature gradient which is lower at the bottom edge.

In accordance with the first preferred embodiment of the present invention, the cooling of the heat distribution plate is effected, as already indicated above, by means of Peltier cells. These Peltier cells are arranged so that they are in contact on one surface of the heat distribution plate which is in heat-conductive connection with the separating chamber, whereas the other surface of the cells is in contact with a cooling source. The heat distribution plate which is in heat-conductive connection with the Peltier cells, is uniformly cooled by these cells. The Peltier cells are connected to an electrical circuit in such a manner that their cold surface faces heat distribution plate and the separation chamber and their hot sruface faces the cooling source. While Peltier cells produce a temperature differential they themselves generate heat in operation. Therefore, it would initially appear unadvantageous to include these cells in the cooling system, which cells generate heat in operation, since the cooling output of the actual cooling system must thereby be increased.

By using Peltier cells, however, a decisive advantage is derived in that the temperature over the entire surface of the separating chamber heat-distribution plate which is connected to these Peltier cells can be maintained so constant that no heat currents are obtained in the separation chamber even when the chamber is arranged vertically or almost vertically. In other words, the separation chamber can be operated without interference even when it is vertically positioned and produce a sharp separation even when high sediment mixtures of substances are to be separated. An effective cell separation has for the first time been made possible with the aid of the apparatus according to the present invention.

Although any desired Peltier cells may be employed, those cells have proved to be particularly advantageous which comprise semiconductor Peltier elements. Such cells have a very favorable degree of effectiveness, so that the Joule heat output is minor and the cooling output of the actual cooling device need only be increased to a minor extent. If it is desired to produce a particularly high temperature constant throughout the separating chamber, for instance, if the temperature is to deviate only by less than $\pm 0.05°$ C. from a predetermined value, the current supply of the Peltier cells may, in accordance with a preferred embodiment of the invention, be controlled individually or in small groups by control devices which are actuated through a temperature sensor which measures the temperature at selected points of the separating chamber.

In accordance with a second preferred embodiment of the invention, the cooling of the heat distribution plate is effected by means of an evaporation cooler. In this embodiment the evaporation cooler is constructed in such a manner that copper tubes are soldered to the side of the heat distribution plate facing away from the separation chamber in horizontal zig-zag fashion, said copper tubes serving as an evaporator in conjunction with a customary cooling agent introduced therein.

In order to maintain the entire surface of the heat distribution plate at as constant a temperature as possible, it is necessary to keep the cross-section of the cooling tubes as large as possible and their length as short as possible, whereby a very low pressure loss between beginning and end of the tube results. Since the pressure also simultaneously determines the evaporation temperature, only an extremely small temperature differential of less than $0.5°$ C. develops between the beginning and end of the cooling tube which, in addition, is further equalized by the thick heat distribution plate. In connection therewith, it is a self-evident prerequisite that the amount of cooling agent must be ample, that is, that a still liquid, not yet evaporated cooling agent is present even at the end of the cooling tubes.

In order that the condensing cooler will not draw up any liquid cooling agent, subsequent evaporation to vapor of the cooling agent is effected in an evaporator located in the heated condenser-air stream, so that the condensing cooler receives only evaporated cooling agent.

Depending upon the desired separating effect and separation output, the electrophoretic separation chamber operates with more or less large potential gradients and current flow, that is, the amount of Joule's heat to be removed may be different for each individual case of separation. Since the cooling capacity of a cooling device cannot readily be altered, the cooling device would have to be switched on and off very frequently by means of a temperature sensor if it is desired to obtain as constant a buffer film temperature as possible. However, this means first of all too much wear and tear and, secondly, it would lead to still excessively large temperature variations despite accurate sensing (actuation at very small temperature differentials) because of the lag of the system. In order to prevent this in the second preferred embodiment, the cooling system is so constructed that a continuous flow is assured, namely, by the known method of inserting a by-pass line betwen the suction side and the pressure side of the condenser, which is controlled by means of an output control valve. By adjustment of this output control, such as a set screw, for instance, by means of a handwheel or automatically, to correspond to the temperature scanned through a temperature sensor, the output of the cooling system may be varied by recycling more or less of the condensed cooling agent vapor into the condenser, depending upon the requirements. In order to avoid overheating of the cooling agent evaporator by the pump circulation, the condensed cooling agent is, also according to known methods, withdrawn from the upper third of the condensing cooler from which the excess heat has already been removed. The control of the output control valve may also be adapted to the separation output of the separation chamber so that a definite amount of heat is withdrawn based on the volume separated. The control may, if desired, be calibrated for the amount of heat to be withdrawn.

If a particularly uniform cooling effect is also to be achieved in vertical direction, where the temperature difference of greater than $0.5°$ C. between the upper and lower parts is to be avoided, several copper tubes may be arranged in horizontal direction, one below the other in separate systems and, as described above, the cooling agent is injected into each system separately. The temperature sensors mounted at suitable positions depending upon the number of cooling coils may then be controlled for each cooling system individually, as described above.

By these means it is possible to achieve that the temperature constants in the separation chamber remained constant at about $0.1°$ C. with constant release of the Joule's heat produced in a horizontal direction, whereas the temperature gradient in a vertical direction was greater by only a minor amount. A heat convection in the buffer film is thus avoided.

The vertical or approximately vertical arrangement of the separation chamber, which is intended to mean a position with an inclination of 70 to 90° with respect to the horizontal, makes a particularly uniform flow of the buffer solution in the separating chamber desirable. In accordance with another preferred embodiment of the invention, such a uniform flow is achieved by introducing as well as withdrawing the buffer solution forcibly through separate pumps, whose uniform operation, that is, whose adjustment for uniform flow rate, is controlled by pressure variations of the buffer solution in the interior of the separation chamber. The buffer solution may, for example, be introduced at the upper edge of the separation chamber at six different points, whereas the number of discharge points may vary depending upon the product being separated. For instance, 50 discharge points may be provided at the lower edge of the separation chamber. Particularly suitable pumps are hose pumps which are driven by pace motors which are connected to a potential whose frequency is modulated as a function of the pressure conditions in the interior of the separation chamber.

For determination of the pressure conditions in the interior of the separation chamber, this chamber or an extension thereof is connected to a level indicator tube, so that the level of the liquid in the indicator tube may be determined optically or electrically. When the liquid level exceeds certain predetermined limits upward or downward, signals are released which are fed into a control device which influence the modulation of the frequency of the potential applied to the pump motors.

For instance, the liquid level indicator tube may be connected with the feed point of the buffer solution and may be mounted at a suitable elevation so that the desired pressure, such as either a sub- or super-atmospheric pressure, exists in the separation chamber. If a subatmospheric pressure is intended in the separation chamber, spacing elements are mounted between the plates of the separation chamber so that a constant distance between the plates is assured. If the separation chamber is to be operated at a super-atmospheric pressure, studs are provided outside of the separation chamber against which the plate abuts when it arches outwardly under the influence of the over-pressure, so that the plate remains in the same plane even under those conditions.

Referring to FIG. 1 of the drawings, it shows a vertically positioned separation chamber 1 into which a substance mixture is introduced at point 2. If no temperature differences occur in this chamber, the paths of the separated components of the substance mixture should follow approximately the straight solid lines 3. However, since temperature differences always occur in a vertically positioned chamber with customary cooling means and since heat currents are always created thereby, the paths shortly after beginning of the operation follow approximately the dotted lines 4. It is evident that in the case of such a path the proper separation of the substance mixture is completely impossible. Upon further operation of the apparatus, the paths of the separated components bend more and more and finally follow the paths shown by interrupted lines 5, which makes any attempt toward separation impossible. Since electrical heat is constantly generated in the buffer liquid by virtue of the electrical field applied to the separation chamber, the occurrence of such heat currents is unavoidable with normal cooling.

Figure 2:
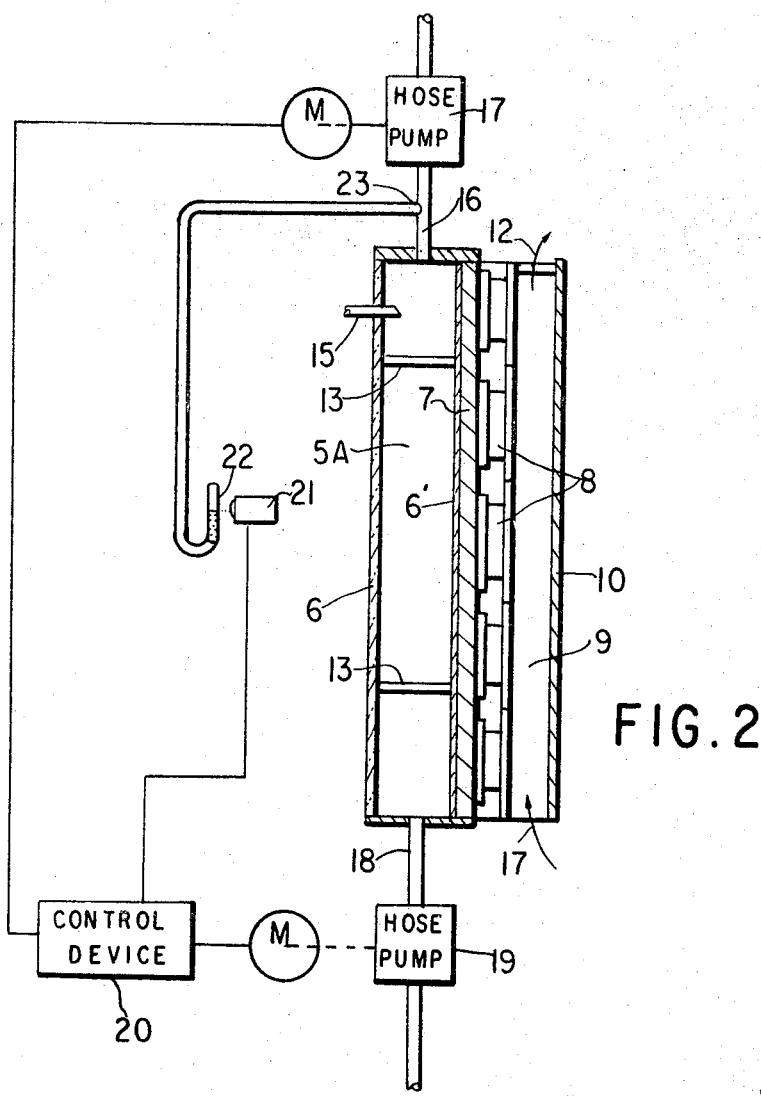
FIG. 2 shows schematically a section through a separation apparatus constructed according to the present invention, where the cooling of the heat distribution plate is effected by means of Peltier cells.

FIG. 2 is a schematic section through the vertically positioned separation chamber 5A. One side of the separation chamber is closed off by an electrically non-conductive plate 6, which is preferably transparent, for instance, glass, while the other side of the separating chamber 5A is closed off by a heat distribution plate 7 having good heat conductive properties, whose inner surface contacts an electrically non-conductive or insulating plate 6', for instance, a glass plate or plastic foil. The separation chamber may, for example, have dimensions of 50 x 50 cm. and, for instance, a silver or copper plate may be used as heat distribution plate 7, which is 5 to 10 mm. thick. If desired, thicker plates may also be used. Of course, in place of copper or silver, another material may also be used which has good heat cnducting properties. On the outer surface of this plate 7, Peltier cells 8 are attached in heat conductive relationship, which are connected to a direct current source so that their cold surface faces the heat distribution plate 7, whereas their hot surface faces the cooling chamber 9. This cooling chamber 9 is closed off by plate 10 and contains a flowing cooling medium which, for example, enters at point 11 and leaves the cooling chamber at point 12. Even though this first preferred embodiment shows liquid cooling means, it is essentially also possible to use another cooling agent, for instance, a gas cooling system in which a gas is directed by means of a blower onto the hot surfaces of the Peltier elements 8.

In accordance with the second preferred embodiment a heat distribution plate cooled by cooling agent evaporation is provided for heat withdrawal. In the case of brine cooling, however, care should be taken that the flow rate of the cooled brine is selected most advantageously in horizontal direction so that a very small difference between brine intake temperature and discharge temperature occurs.

In the separation chamber, which is formed by the two insulating plates 6 and 6', spacer elements 13 are provided which not only fix the separation of the plates at a desired distance, for instance, at 0.5 mm. or also 1–2 mm., but also prevent that the electrically non-conductive or insulating plates arch toward the interior when the chamber is under a vacuum. The number and position of these spacing elements is selected to be such that the paths of the separated components are not interrupted and that nevertheless plates 6 and 6' are completely flat. Since the chamber may also be operated at an over-pressure, abutment elements (not shown) are provided in place of or together with the internally mounted spacing elements 13 on the outside of the plate 6, whereby the outwardly arching of plate 6 due to the over-pressure is avoided and the flat position of this plate is assured. At point 15 the substance mixture to be separated is introduced by means of a conventional metering pump. At the upper edge of the separation chamber, buffer solution is introduced by means of a number of lines 16 connected to pump 17. At the lower edge this buffer solution is passed through line 18 into a pump 19. Air pumps 17 and 19, preferably hose pumps, are adjusted to equal flow rate by means of a control device 20. Control device 20 is actuated by a sensor 21 which scans, for instance optically or mechanically, the level of the buffer liquid in the liquid level tube 22. Tube 22 is connected at a suitable point, for instance, at point 23, with the buffer liquid flowing through the separation chamber 14. When the level of the buffer liquid changes in the liquid level tube 22, the control device 20 actuates pumps 17 and 19, for instance, in that the control device gives off a frequency modulated potential which actuates pace motors which in turn drive pumps 17 and 19.

In order to increase the safety of the apparatus, additional devices may be provided which are not shown in the present drawings and which may be automatically operated, where the actuation is released by sensors which respond to the conductivity.

For instance, when the level in the liquid level tube decreases excessively, a relay may be actuated whereby the electrical current supply is interrupted so that the device is shut off.

Furthermore, a device may be provided, which is also not shown in the present drawing but which shuts off the liquid entering the metering pump so that only air is aspirated through this metering pump. By means of a delayed action switch, the motor of the metering pump may be shut off after a short period of time and a few hours later, that is, after a time when it can be assumed that the substance introduced into the chamber has been quantitatively withdrawn from the separating chamber, the entire apparatus may be shut off.

Another safety switch, which may also be actuated through a conductor cell, responds to leaks in the chamber, for instance, when the plate 6 cracks or when the feed or discharge hoses are damaged, whereby the entire apparatus is shut off. The pressure variation occurring in the event of such leaks is determined, for instance, by connecting a liquid level tube which is in communication with the interior of the separation chamber with a conductor cell which in turn actuates the main switch of the apparatus through a relay.

Figure 3:
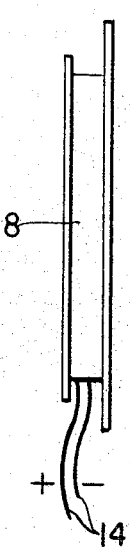
FIG. 3 is a section through a Peltier cell.

FIG. 3 shows a section through a customary Peltier cell 8, for instance, through Peltier cell Pt 20/20, which is commercially sold by the Valvo Company. These cells, which consist of Peltier semiconductive elements, are supplied with direct current through lines 14 and have a degree of effectiveness which is sufficient for the intended purpose.

Figure 4:
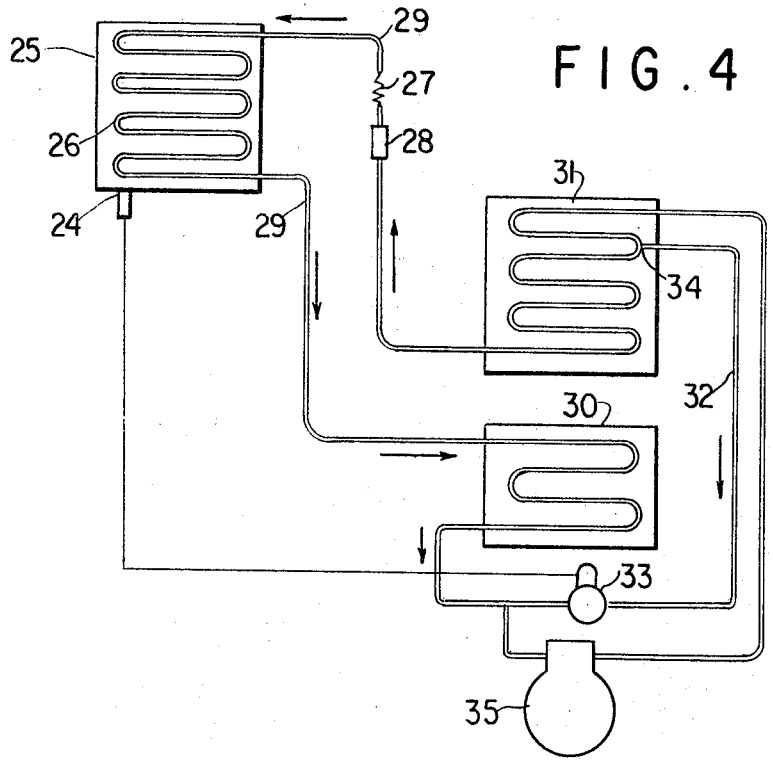
FIG. 4 shows schematically the cooling agent flow circuit in the case of cooling by means of an evaporation cooler.

FIG. 4 shows schematically the arrangement of the heat distribution plate with the cooling agent circulation necessary for the invention. A copper plate 25 with dimensions of 49 x 49 cm., for instance, and about 1 cm. thick, has soldered to its back side a copper tube 26 of 16 mm. diameter in horizontal zig-zag coils with 35 mm. distance between the centers of the tubes. The back side is lined with a heat conducting putty. The injection of cooling agent by means of capillary tube 27 takes place at the top of the vertical plate and the withdrawal at the bottom. The capillary tube is connected to a drying cartridge 28. For the purpose of movability of the copper plate, both of these connections for the discharge and injection lines are made by means of flexible cooling agent hoses 29, which are insulated with a sponge rubber hose. The discharge line leads to an evaporator 30 which is positioned in the warm air section of the condensing cooler air stream. Thereafter the vapors are condensed by condenser 35 and lead to the condensing cooler 31. The condensing cooler 31 is cooled with air or water in customary washion. Between a by-pass line 32 an output control valve 33 is mounted which is actuated by hand or, if it is fashioned as a pressure valve, by means of a temperature sensor 24 depending upon the desired temperature. The output of the cooling system is thereby correspondingly altered because, depending upon the requirements, more or less condensed cooling agent vapors are again recirculated into the condensing cooler 31. In order to avoid over-heating by the pump circulation, the condensed cooling agent is withdrawn in the upper third of the condensing cooler 31 at a point 34.

Figure 5:
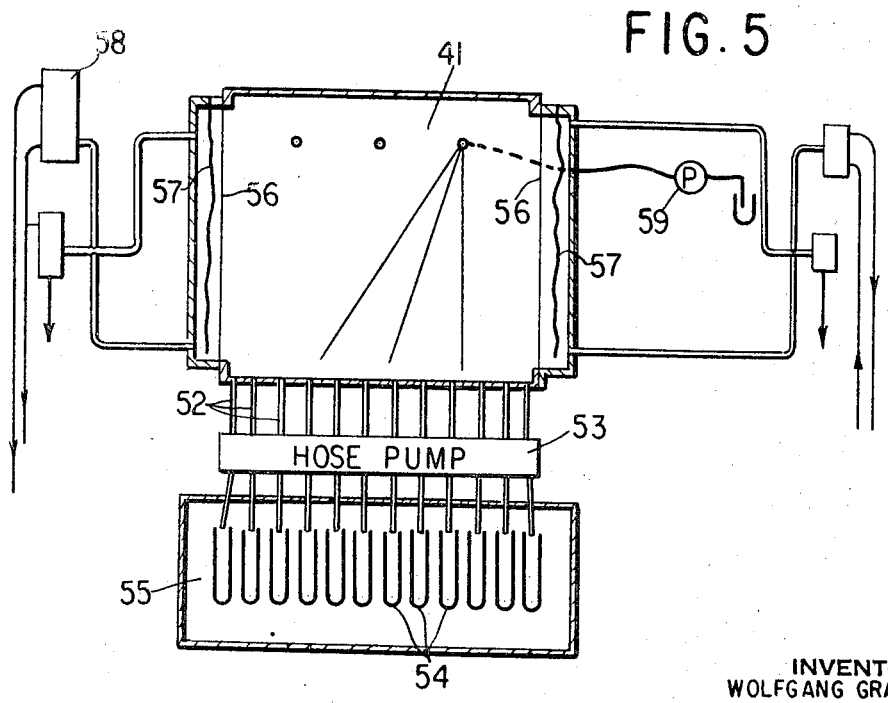
FIG. 5 is an over-all view of an apparatus for continuous vertical electrophoresis according to the present invention.

FIG. 5 shows schematically a front view of the separation apparatus. Fifty discharge tubes 52 are attached to the bottom of separation chamber 41, said discharge tubes passing the separated fractions through a hose pump 53 into collection vessels 54 which are advantageously positioned in a space 55 which is also cooled. By virtue of a uniform squeezing of all 50 discharge tubes with the aid of the hose pump, a very uniform flow of the buffer film within the separation chamber is assured. Thus, even high temperature sensitive substances are maintained corresponding cool during the entire separation of the substance. The introduction of the substance mixture is effected by means of a small metering pump 59 which may also be a hose pump. The substance mixture to be separated may be cooled for the same reason as described above. The accuracy of the separation method is increased if the walls of the separation chamber, for instance, the inner surfaces of the plates through which the buffer film enters, are wetted as little as possible. Errors, namely, electroosmosis and adsorption, are substantially avoided thereby. An organo-polysiloxane coating or a plastic foil of a hydrophobic organic plastic have been found to be particularly advantageous for this purpose. The electrical field within the separation chamber is preferably generated by providing an electrolyte or ionically conductive connection with platinum electrodes 57 at the lateral edges of the separation chamber 41 through two membranes 56, said platinum electrodes being vigorously rinsed with buffer solution for the purpose of withdrawing electrolysis products. The buffer solution simultaneously represents the electrically conductive connection with the separation chamber. It has been found to be advantageous to use ion exchange membranes as the membranes 56 on both sides, the anion exchange membrane being positioned on the cathode side and the cation exchange membrane on the anode side. Anions migrating toward the anode in the separation chamber are thereby blocked at the cation membrane and are passed vertically toward the bottom through the flowing buffer film where they are withdrawn by means of the above described discharge device. New anions can migrate undisturbed through the anion exchange membrane at the cathode side from the buffer solution to the electrode rinsing point in the separation chamber. The same applies in the reverse sense to the migration of the cation. This arrangement achieves that, with the exception of a very narrow area along the inner side of the membranes, a constant electrolyte concentration and composition is maintained in the separation zone of the chamber and no pH variations occur to produce an interfering effect. Advantageously, the concentration of the buffer solution which rinses the electrodes 57 is maintained higher than the concentration of the buffer solution in the separation chamber 41, otherwise the conductivity of the electrode buffer solution would decrease by virtue of electrolytic decomposition at the electrodes, which would lead to an excess voltage.

Since the membranes used in the apparatus possess a very large conductivity because they are permeable for a certain type of ions but are practically water impermeable, it is necessary to maintain the hydrostatic pressure gradient in the separation chamber as uniform as that in the electrode chambers; for this purpose liquid level control vessels 58 are provided on both sides of the electrode chambers in the buffer current which make possible the desired control of the hydrostatic pressure.

With the aid of the apparatus according to the present invention a number of separations can be performed which heretofore have not been capable of performance with apparatuses of this type or only with great difficulties and with low yields.

The following specific embodiments of the invention are illustrative of the practice of the same. It is to be understood however that they are non-limiting and that other expedients may be employed.

EXAMPLE 1

Separation of microsomes and mitochondria from liver cells

A fractionation of the cell fragments proceeded very well under the following conditions:

Michaelis-sorbitol buffer pH 7.0; consisting of 9.7 gm. sodium acetate+14.7 gm. sodium diethyl barbiturate dissolved in 1 liter of water, 1180 ml. of 0.1 N hydrochloric acid +400 ml. of aqueous 8.5% sodium chloride solution+2760 ml. of water. To one part of this solution, 9 parts of an aqueous 5.46 sorbitol solution were added.

The size of the separation chamber was 500 x 500 mm. and the plate distance was 0.6 mm.; 32 Peltier cells were used; the throughput was 260 ml. per hour, the voltage 2100 volts, the current 130 miliamperes, and the temperature +4° C.

EXAMPLE 2

Separation of spinach cell fragments

Spinach was ground with fine sand in an aqueous 0.35 molar sodium chloride solution and was then forced through a double thicknes of muslin in order to separate the sand and the leaf residues. The pressed juice was then centrifuged to separate the residual sand particles and the destroyed cell walls.

The supernatant liquid, which contained among other soluble components the chloroplasts, mitochondrias, microsomes, as well as cell nuclei and their components, such as chromosomes, was directly injected into the separation apparatus for electrophoretic separation.

The throughput was at a rate of about 5 ml. of suspension per hour.

A sodium acetate buffer of pH 4.9 with an ion strength of 0.035 was used, which in addition contained 2.5% cane sugar in order to increase the osmotic pressure.

The size of the separation chamber was 500 x 500 mm. and the plate distance of the separation chamber was 0.6 mm., the buffer throughput was 250 ml. per hour, the the potential 1700 volts, the current intensity 190 milliamperes, and the temperature of the buffer film +4° C.

All of the above-indicated cell components were satisfactorily separated. As determined by microscopic examination at 200 times magnification, they were obtained with a purity which had heretofore not been obtained with the aid of other processes (for example, fractional centrifugation).

The preceding specific embodiments are illustrative of the invention. It is to be understood however that other expedients known to those skilled in the art may be employed without departing from the spirit of the invention or the scope of the appended claims.

We claim:

1. Apparatus for continuous free-flow electrophoresis comprising two rectangular, electrically non-conductive plates in spaced alignment to each other forming a separation chamber, said separation chamber being substantially in a vertical arrangement; a pair of electrode chambers each ionically connected to one of a pair of opposite side edges of said plates and ionically communicating with said separating chamber, each of said electrode chambers enclosing at least one electrode electrically connected to an electrical source; a third marginal top section of said separating chamber being electrically non-conductive and tightly sealed between said electrode chambers; at least one connection to a buffer solution and supply feed inlet to said separation chamber adjacent to said third marginal top section; the marginal space opposite said feed inlet connections being closed by a horizontal bar having a plurality of outlets arranged at regular intervals over its entire length between said electrode chambers communicating with a plurality of receptacles, each of said outlets extending from the inner separating space between said plates to its paired outer receptacle for solution flowing out of said outlet whereby each of said receptacles is in liquid connection; means for supplying buffer solution and material to be electrophoretically separated to said feed inlet connections; and means for intermittently withdrawing electrophoretically separated material and buffer solution from each of said collecting receptacles simultaneously and in equal volume in ratio to the flow rate through said separating space; and at least one cooling means comprising a heat distribution plate which is in heat-conductive, electrically non-conductive connection with said separation chamber, said heat distribution plate consisting of a heat-conductive material being in heat-conductive contact at a plurality of points with a plurality of Peltier cells on its surface which faces away from said separation chamber.

2. Apparatus according to claim 1 having means to control the current supply of said Peltier cells as a function of the temperature prevailing in said separation chamber.

3. Apparatus for continuous free-flow electrophoresis comprising two rectangular, electrically non-conductive plates in spaced alignment to each other forming a separation chamber, said separation chamber being substantially in a vertical arrangement; a pair of electrode chambers each ionically connected to one of a pair of opposite side edges of said plates and ionically communicating with said separating chamber, each of said electrode chambers enclosing at least one electrode electrically connected to an electrical source; a third marginal top section of said separating chamber being electrically non-conductive and tightly sealed between said electrode chambers; a plurality of connections to buffer solution supply feed inlets to said separation chamber adjacent to said third marginal top section; at least one connection to a feed inlet for material to be electrophoretically separated to said separation chamber adjacent to said third marginal top section; the marginal space opposite said feed inlet connections being closed by a horizontal bar having a plurality of outlets arranged at regular intervals over its entire length between said electrode chambers communicating with a plurality of receptacles, each of said outlets extending from the inner separating space between said plates to its paired outer receptacle for solution flowing out of said outlet whereby each of said receptacles is in liquid connection; means for supplying buffer solution and material to be electrophoretically separated to said feed inlet connections; and means for intermittently withdrawing electrophoretically separated material and buffer solution from each of said collecting receptacles simultaneously and in equal volume in ratio to the flow rate through said separating space; and at least one cooling means comprising a heat distribution plate which is in heat-conductive, electrically non-conductive connection with said separation chamber, said heat distribution plate consisting of a heat-conductive material being in heat-conductive contact at a plurality of points with a plurality of Peltier cells arranged below each other on its surface which faces away from said separation chamber, means to separately control the cooling output of said Peltier cells whereby a temperature differential of about 0.5° C. is maintained between the top and the bottom of said heat distribution plate.

4. Apparatus for continuous free-flow electrophoresis comprising two rectangular, electrically non-conductive plates in spaced alignment to each other forming a separation chamber, said separation chamber being substantially in a vertical arrangement; a pair of electrode chambers each ionically connected to one of a pair of opposite side edges of said plates; water impermeable, ion exchange membranes interposed between said electrode chambers and said separation chamber whereby said electrode chambers are ionically communicating with said separating chamber, each of said electrode chambers enclosing at least one electrode electrically connected to an electrical source; a third marginal top section of said separating chamber being electrically non-conductive and tightly sealed between said electrode chambers; at least one connection to a buffer solution and supply feed inlet to said separation chamber adjacent to said third top marginal section; the marginal space opposite said feed inlet connections being closed by a horizontal bar having a plurality of outlets arranged at regular intervals over its entire length between said electrode chambers communicating with a plurality of receptacles, each of said outlets extending from the inner separating space between said plates to its paired outer receptacle for solution flowing out of said outlet whereby each of said receptacles is in liquid connection; means for supplying buffer solution and material to be electrophoretically separated to said feed inlet connections; and means for withdrawing electrophoretically separated material and buffer solution from each of said collecting receptacles simultaneously and in equal volume in ratio to the flow rate through said separating space; and at least one cooling means comprising a heat distribution plate which is in heat-conductive, electrically non-conductive connection with said separation chamber, said heat distribution plate consisting of a heat-conductive material being in heat-conductive contact at a plurality of points with a plurality of Peltier cells on its surface which faces away from said separation chamber.

5. Apparatus according to claim 4, characterized in that said means for supplying buffer solution is a pump, said means for withdrawing electrophoretically separated material and buffer solution is a separate pump, said pumps being driven by electric motors, means for supplying said pump motors with frequency modulated voltage, and a control means to control the frequency of said voltage being controlled as a function of the pressure of the buffer solution in the separation chamber whereby a steady pressure in said separation chamber is maintained and a steady flow rate through said separation chamber is maintained.

6. Apparatus according to claim 5 characterized in that said control means comprises means to measure the pressure variations of the buffer liquid at a liquid level tube which is connected with the feed point of the buffer solution and whose height varies depending upon the desired pressure in said separation chamber.

7. Apparatus for continuous free-flow electrophoresis comprising two rectangular, electrically non-conductive plates in spaced alignment of each other forming a separation chamber, said separation chamber being substantially in a vertical arrangement; a pair of electrode chambers each ionically connected to one of a pair of opposite edges of said plates and ionically communicating with said separating chamber, each of said electrode chambers enclosing at least one electrode electrically connected to an electrical source; a third marginal top section of said separating chamber being electrically nonconductive and tightly sealed between said electrode chambers; at least one connection to a buffer solution and supply feed inlet to said separation chamber adjacent to said third marginal top section; the marginal space opposite said feed inlet connections being closed by a horizontal bar having a plurality of outlets arranged at regular intervals over its entire length between said electrode chambers communicating with a plurality of receptacles, each of said outlets extending from the inner separating space between said plates to its paired outer receptacle for solution flowing out of said outlet whereby each of said receptacles is in liquid connection; means for supplying buffer solution and material to be electrophoretically separated to said feed inlet connections; and means for withdrawing electrophoretically separated material and buffer solution from each of said collecting receptacles simultaneously and in equal volume in ratio to the flow rate through said separating space; at least one cooling means comprising a heat distribution plate which is in heat-conductive connection with a wall of the separation chamber, said heat distribution plate consisting of a heat-conductive material being in heat-conductive contact at a plurality of points with Peltier cells on its surface which faces away from said separation chamber; at least one means for continuously measuring the conductivity of the solution in said separating space; at least one safety device to control the electricity supplied to said electrodes and means associated with said means for continuously measuring the conductivity to actuate at least one safety device when said conductivity varies beyond a prescribed amount.

8. The apparatus of claim 1 wherein the walls of said separation chamber are provided with a nonwettable coating.

9. The apparatus of claim 8 wherein said nonwettable coating is an organopolysiloxane coating.

10. The apparatus of claim 8 wherein said nonwettable coating is a hydrophobic plastic film.

11. Apparatus for continuous free-flow electrophoresis comprising two rectangular, electrically nonconductive plates in spaced alignment to each other forming a separation chamber, said separation chamber being substantially in a vertical arrangement; a pair of electrode chambers each ionically connected to one of a pair of opposite edges of said plates and ionically communicating with said separating chamber, each of said electrode chambers enclosing at least one electrode electrically connected to an electrical source; a third marginal top section of said separating chamber being electrically non-conductive and tightly sealed between said electrode chambers; at least one connection to a buffer solution and supply feed inlet to said separation chamber adjacent to said third marginal top section; the marginal space opposite said feed inlet connections being closed by a horizontal bar having a plurality of outlets arranged at regular intervals over its entire length between said electrode chambers communicating with a plurality of receptacles, each of said outlets extending from the inner separating space between said plates to its paired outer receptacle for solution flowing out of said outlet whereby each of said receptacles is in liquid connection; means for supplying buffer solution and material to be electrophoretically separated to said feed inlet connections; and means for withdrawing electrophoretically separated material and buffer solution from each of said collecting receptacles simultaneously and in equal volume in ratio to the flow rate through said separating space; at least one cooling means comprising a heat distribution plate which is in heat-conductive connection with a wall of the separation chamber, said heat distribution plate consisting of a heat-conductive material being in heat-conductive contact at a plurality of points with Peltier cells on its surface which faces away from said separation chamber; means to cool said receptacles; and means to cool said buffer solution and supply feed inlet connections whereby the entire apparatus and the buffer solution and material to be electrophoretically separated are maintained at approximately the same temperature during the operation of the apparatus.

References Cited

UNITED STATES PATENTS

| | | | |
|---|---|---|---|
| 2,878,178 | 3/1959 | Bier | 204—180 |
| 3,085,956 | 4/1963 | Caplan | 204—180 |
| 3,125,500 | 3/1964 | Grassman et al. | 204—299 |
| 3,208,929 | 9/1965 | Raymond et al. | 204—299 |

FOREIGN PATENTS 716,875  10/1954  Great Britain.

OTHER REFERENCES

Lederer et al.: Chromatography, 1957, pages 11 and 12. Journal of Chromatography 4 (1960), pages 283–288, 291.

JOHN H. MACK, Primary Examiner

A. C. PRESCOTT, Assistant Examiner

U.S. Cl. X.R.

204—180